United States Patent
Jiang et al.

(10) Patent No.: US 7,349,059 B2
(45) Date of Patent: Mar. 25, 2008

(54) LIQUID CRYSTAL CELL ASSEMBLY METHOD AND SYSTEM

(75) Inventors: Yingqiu Jiang, Sunnyvale, CA (US); Marvin Ancheta, San Jose, CA (US); Swee Yong Pung, Rumpur Pernai (MY); Wan Kwau Cheou, Shah Alam (MY)

(73) Assignee: Reveo, Inc., Hawthorne, NY (US)

( * ) Notice: Subject to any disclaimer, the term of this patent is extended or adjusted under 35 U.S.C. 154(b) by 212 days.

(21) Appl. No.: 10/958,201

(22) Filed: Oct. 4, 2004

(65) Prior Publication Data
US 2005/0105040 A1   May 19, 2005

Related U.S. Application Data

(60) Provisional application No. 60/508,067, filed on Oct. 2, 2003.

(51) Int. Cl.
*G02F 1/1339* (2006.01)
*G02F 1/1341* (2006.01)

(52) U.S. Cl. .................. 349/187; 349/189; 349/190
(58) Field of Classification Search ............. 349/187, 349/189, 190
See application file for complete search history.

(56) References Cited

U.S. PATENT DOCUMENTS 5,854,664 A * 12/1998 Inoue et al. .................. 349/92
6,671,008 B1 * 12/2003 Li et al. ........................ 349/16

* cited by examiner

*Primary Examiner*—Toan Ton
*Assistant Examiner*—Tai Duong
(74) *Attorney, Agent, or Firm*—Ralph J. Crispino

(57) ABSTRACT

Herein provided is a liquid crystal cell manufacturing process and assembly system. Mechanical steps are performed under substantially atmospheric conditions (as opposed to in a vacuum environment) thereby simplifying liquid crystal cell assembly. Under such conditions, it is economically feasible to produce large panel, bubble-free liquid crystal cells.

5 Claims, 6 Drawing Sheets

LIQUID CRYSTAL CELL ASSEMBLY METHOD AND SYSTEM

CROSS-REFERENCE TO RELATED APPLICATIONS

This application claims the benefit under 35 U.S.C. §119 (e) of U.S. Provisional Patent Application Ser. No. 60/508,067 filed on Oct. 2, 2003, entitled "Liquid Crystal Cell Assembly Method and System," which is incorporated by reference herein.

BACKGROUND OF THE INVENTION

Liquid crystal based devices are ubiquitous, enjoying applications ranging from miniaturized displays on portable phones, computers, and other devices, and small and large size monitors. Liquid crystal technology is also attractive for application in switchable windows.

In manufacturing LC cells, particularly large size LC cells, the step of LC filling is often a bottleneck. The main drawbacks of conventional processes such as "vacuum filling" and "vacuum pulling" include extensive processing time, as well as streaky appearance after curing (particularly along the LC filling holes). Thus, overall yield is low with conventional LC filling processes.

Similarly, in LCD manufacturing process, LC filling is a very slow and costly step. This is extremely important when panel sizes increase beyond, e.g., 20 inches (diagonal), with a very small (e.g., about 2 to 5 micrometers) cell gap. It is not uncomfortable for filling times to exceed 9 hours.

Conventional LC cell filling methods are based on creation of a pressure difference between the interior and exterior of an empty cell. Empty cells are generally pre-fabricated and placed inside of a vacuum chamber to create pressure difference. LC material is pushed into the cell through a filling hole when the pressure inside the chamber is resumed to 1 atmosphere. Evacuation of air from the interior of the empty LC cell is an extremely slow process, especially when the size of the LC panels increases in dimensions.

Though a "one-drop" filling method has been developed in recent years that has reduced filling time from hours to minutes, many of the steps (LC dispensing, sealant dispensing and curing, cell registration) must be carried out in a vacuum environment in order to avoid trapping air bubbles. Such process requires sophisticated systems, requiring high equipment cost and inconvenient operation.

The conventional one-drop-filling methods attempted to reduce the time of LC cell filling by dispensing the LC materials in a controllable manner within a vacuum environment. Trapped vacuum bubbles are compressed and eliminated after the cell is brought to 1 atmosphere. However, the one-drop-filling method is not a suitable solution for atmospheric environments, due to the fact that its dispensing mechanism will result in trapped bubbles. Therefore the process is still complicated and costly with the requirement of a vacuum environment for steps such as dispensing, registration, and lamination.

Therefore, a need remains in the art of LC cell fabrication for an LC dispensing mechanism capable of operation (partially or in its entirety) in pressure conditions other than vacuum conditions, or other than systems requiring substantial pressure differential as is required for conventional LC filling systems and methods. Such systems must minimize or eliminate formation of bubbles in the resulting LC panels.

SUMMARY OF THE INVENTION

The present application provides a liquid crystal cell manufacturing process and assembly system whereby mechanical steps are performed under substantially atmospheric conditions (as opposed to in a vacuum environment) thereby simplifying liquid crystal cell assembly. Particularly, the mechanical steps of assembling, dispensing liquid crystal material, aligning and adhering are preferably performed under substantially atmospheric conditions.

The herein methods and systems provide bubble-free liquid crystal cells whereby mechanical step are undertaken in substantially atmospheric conditions. These methods and systems enable assembly of large size (e.g., having a width or height dimension greater than or equal to about 0.5 meters) bubble-free liquid crystal cells.

One method of manufacturing LC cells generally comprises:
providing a first substantially planar substrate in a first position having a first substrate inner surface and a first substrate outer surface in an atmospheric environment;
providing a second substantially planar substrate having a second substrate inner surface and a second substrate outer surface in an atmospheric environment, wherein the first substrate inner surface and the second substrate inner surface face each other, and further wherein the second substrate is in a second position;
temporarily adhering a first distal end of both the first substrate and the second substrate
lifting the second substrate from the second end such that said second substrate is at an angle alpha relative to said first substrate in said first position, thereby forming a substrate sub-assembly in an atmospheric environment;
dispensing degassed liquid crystal material on said first substrate inner surface in an atmospheric environment;
tilting said substrate sub-assembly while maintaining the angle alpha between the first substrate and the second substrate to allow said liquid crystal material to flow toward said first distal end in an atmospheric environment, whereby said liquid crystal material flows in a direction towards side ends at said first distal end;
returning said substrate sub-assembly to the position whereby said first substrate is in said first position, and reducing the angle alpha to a zero angle so that the first substrate and the second substrate are adjacent;
temporarily adhering the second distal end and the sides of both the first substrate and the second substrate in an atmospheric environment;
laminating the temporarily adhered substrate sub-assembly to allow the liquid crystal material to cover the substrate inner surfaces; and
sealing the substrate assembly.

In another method of manufacturing LC cells generally comprises:
providing a first substantially planar substrate in a first position having a first substrate inner surface and a first substrate outer surface in an atmospheric environment;
dispensing degassed liquid crystal material on said first substrate inner surface in an atmospheric environment;
providing a second substantially planar substrate having a second substrate inner surface and a second substrate outer surface in an atmospheric environment, wherein the first substrate inner surface and the second substrate inner surface face each other, and further wherein the second substrate is in a second position;
temporarily adhering a first distal end of both the first substrate and the second substrate, while maintaining opposite second distal ends of the first substrate and the second substrate such that said second substrate is at an angle alpha relative to said first substrate in said first position, thereby forming a substrate sub-assembly in an atmospheric environment;

tilting said substrate sub-assembly while maintaining the angle alpha between the first substrate and the second substrate to allow said liquid crystal material to flow toward said first distal end in an atmospheric environment, whereby said liquid crystal material flows in a direction towards side ends at said first distal end;

returning said substrate sub-assembly to the position whereby said first substrate is in said first position, and reducing the angle alpha to a zero angle so that the first substrate and the second substrate are adjacent;

temporarily adhering the second distal end and the sides of both the first substrate and the second substrate in an atmospheric environment;

laminating the temporarily adhered substrate sub-assembly to allow the liquid crystal material to cover the substrate inner surfaces; and sealing the substrate assembly.

In a preferred embodiment, the flow of dispensed liquid crystal material when the sub-assembly is tilted is optimized so that bubbling of the material prior to or during lamination is minimized, and preferably eliminated. One method to accomplish this is characterized by "point contact" at the first distal end (i.e., the end temporarily sealed prior to tilting). This point contact is most preferably limited to a single point along the first distal end. After contacting the first distal end, and during the return of the sub-assembly from the tilted position, liquid crystal material flows along the first adhered distal edge toward the sides. If single point contact is not attained (i.e., the liquid crystal material flows to multiple points along the first distal end), there is a tendency for air to become trapped between said multiple points, substantially preventing escape.

DETAILED DESCRIPTION OF THE INVENTION

Liquid crystal based devices are provided, and methods of manufacturing such liquid crystal based devices are described, whereby substantial manufacturing cost savings may be realized. The methods may be applied to manufacture of display devices, switchable window structures, or other liquid crystal devices.

Figure 1:
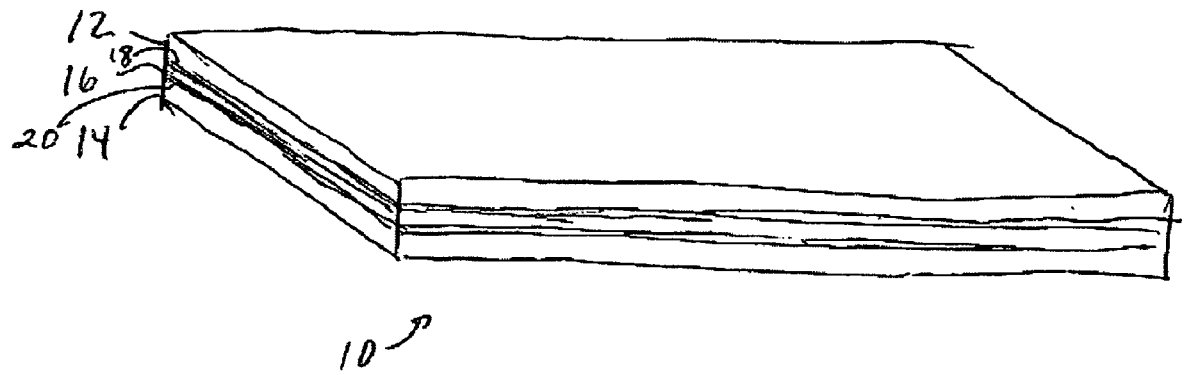
FIG. 1 depicts an example of a liquid crystal cell assembly.

A switchable window 10 is schematically shown in FIG. 1. The switchable window 10 generally comprises a pair of substrates 12, 14, and a liquid crystal layer 16. A voltage is applied to the liquid crystal material layer 16 via suitable conductors 18, 20, in order to transform the optical properties of the liquid crystal material, as is known to those in the art. For example, said liquid crystal material may be switched from substantially transparent to scattered or opaque.

One key problem associated with manufacture of such liquid crystal cells, especially large size liquid crystal cells, is the entrapment of air bubbles therein. A conventional solution to minimize this phenomenon is to perform assembly, lamination, alignment and otherwise manufacturing steps in a vacuum environment.

The present disclosure describes novel LC filling and panel sealing processes. Such processes preferably result in bubble minimization or complete elimination. Further, the presently disclosed methods and systems are readily adaptable to large LC panel sizes. A key distinction between the present disclosure and those taught in conventional systems lies in the LC dispensing mechanisms. The present disclosure features a method to minimize or eliminate entrapment of air bubbles when top and bottom substrates are merge together to form a "cell" structure. This process can be used for various types of LC cells.

The herein described LC dispensing and cell sealing processes are preferably carried out in an atmospheric environment. Accordingly, the equipment required is simple and inexpensive. Further, the herein described LC dispensing and cell sealing processes are adaptable to various liquid crystal materials, including but not limited to materials such as certain nematic, smectic (e.g., ferroelectric), discotic; or cholesteric liquid crystals. Such materials may be used alone or in mixtures such as polymer dispersed liquid crystal, polymer stabilized cholesteric texture (PSCT), or other suitable combinations. For example, suitable PSCT mixtures have viscosities of about 40 centipoises to about 80 centipoises. However, the present techniques may be applicable to liquid crystal blends having viscosities of up to about 100 centipoises, up to about 300 centipoises, or even higher depending on conditions and cell dimensions. Furthermore, the present techniques may be adaptable to other materials having similar viscosities.

Referring now to FIGS. 2A-9, preferred methods of manufacturing liquid crystal cells are provided. In general, the substrates used herein prepared according to known practices. For example, for switchable windows, the first and second substrates may comprise suitable transparent substrates having appropriate conductive layers, such as indium-tin-oxide, as is generally known to those skilled in the art of switchable windows. For displays, the first substrate may generally comprise a suitable addressing structure, such as thin film transistors (TFT), and the second substrate may comprise suitable color filter(s), or vice versa, as is known to those skilled in the art of LC displays. In general, substrate preparation entails cleaning of both the first and second substrates, e.g., in an ultrasonic cleaning system. Further substrate preparation may include application of suitable spacers 39 to maintain a constant distance between substrates. For example, fiber spacers 39 may be sprayed onto the first (bottom) substrate, e.g., with the conductive or filter side facing upwards. Note that spacers 39 may also be incorporated into the liquid crystal material mixture.

Figure 2A:
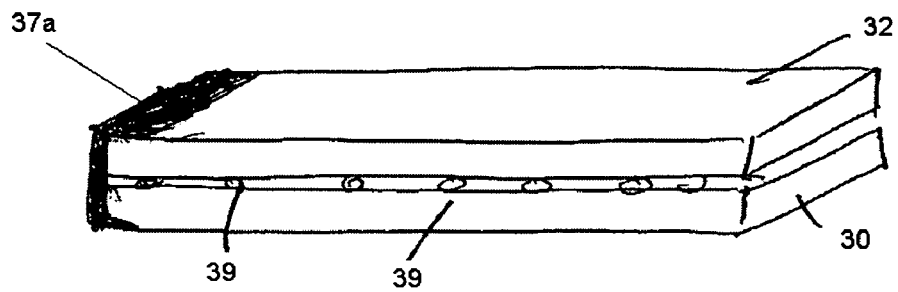
FIG. 2A shows a first general step for manufacturing a liquid crystal cell assembly according to one embodiment of the assembly method herein.

Referring particularly to FIG. 2A, a first substantially planar substrate 30 (oriented as the bottom substrate in the Figures) is provided in a first position. The first substrate includes a first substrate inner surface and a first substrate outer surface. Further, a second substantially planar substrate 32 (oriented as the top substrate in the Figures) having a second substrate inner surface and a second substrate outer surface is provided, wherein the first substrate inner surface and the second substrate inner surface face each other, and further wherein the second substrate is in a second position. The first and second substrates 30, 32 are temporarily adhered at first distal ends of both the substrates, e.g., with tape 37*a*.

Figure 3A:
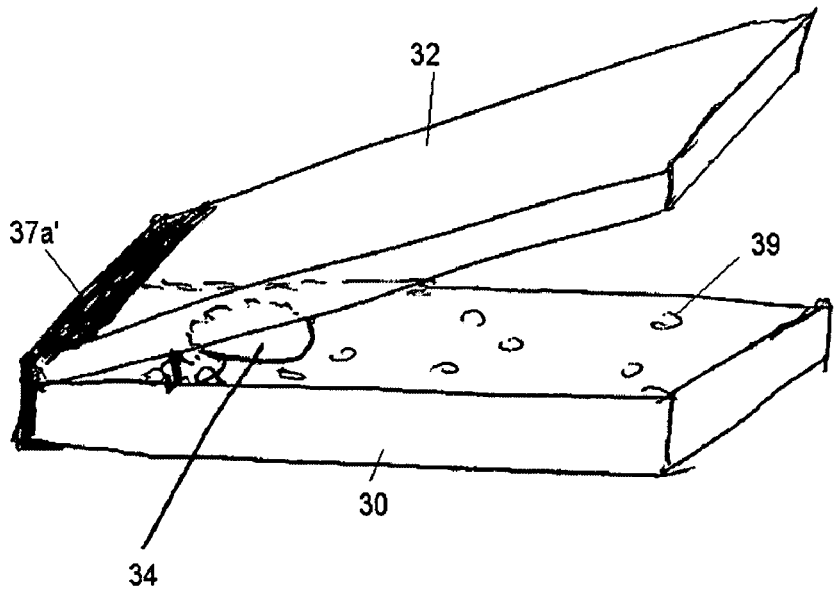
FIG. 3A shows a second general step for manufacturing a liquid crystal cell assembly according to one embodiment of the assembly method herein.
Figure 4:
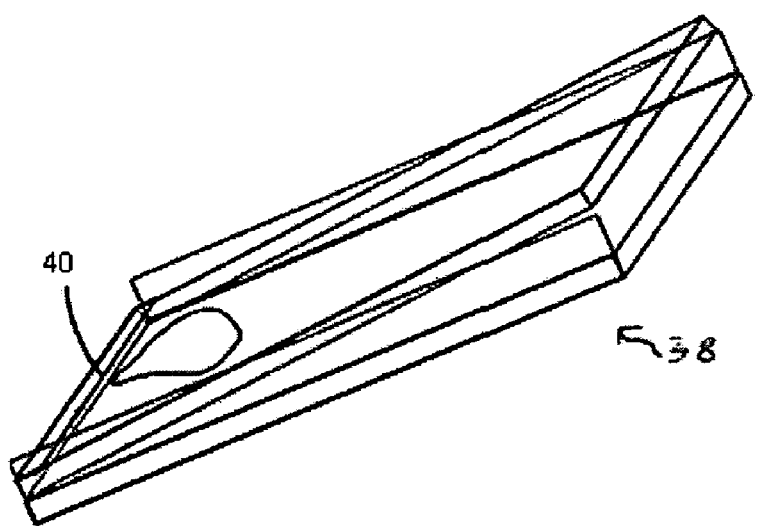
FIG. 4 shows a third general step for manufacturing a liquid crystal cell assembly, showing tilting of a liquid crystal cell sub-assembly while maintaining the angle alpha between substrates and point contact of liquid crystal material at a temporarily adhered edge.

Referring to FIG. 3A, the second substrate 32 is lifted from a second end such that said second substrate 32 is at an angle alpha relative to the first substrate 30 in the first position, thereby forming a substrate sub-assembly in an atmospheric environment. Degassed liquid crystal material is dispensed on said first substrate inner surface in an atmospheric environment. The steps of FIGS. 2A and 3A provide a liquid crystal cell sub-assembly 38 (FIG. 4).

Figure 2B:
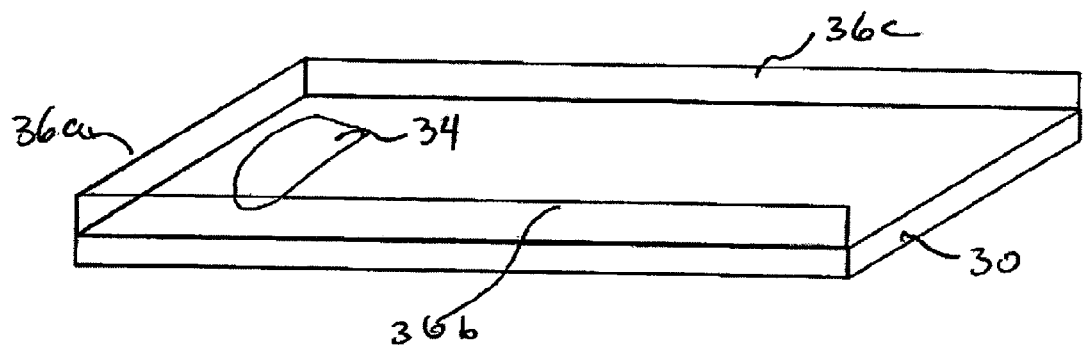
FIG. 2B shows a first general step for manufacturing a liquid crystal cell assembly according to a second embodiment of the assembly method herein.

In an alternative, and referring particularly now to FIG. 2B, a first substrate 30 is provided. An LC dispensing step is shown. LC material mixture is degassed, e.g., in a vacuum chamber. A quantity of LC material is dispensed to form a mass 34 of material. The quantity of LC material used to form the mass 34 should be sufficient to ultimately fill between the substrates 30, 32. The LC material may be dispensed, e.g., through a separation funnel or other suitable dispensing tools. Preferably, agitation is avoided during dispensing.

Still referring to FIG. 2B, commencing steps of lamination are shown. For example, the bottom side of the three edges of the bottom substrate 30 with single-sided tape or any other type of removable adhesive, e.g., 36*a*,36*b* and 36*c*. The adhesion of the tape should to be sufficiently strong to hold the substrates together during processing, yet sufficiently easy to remove at a later processing stage. One suitable tape has been identified as being commercially available from Nashua Aluminum Foil.

Figure 3B:
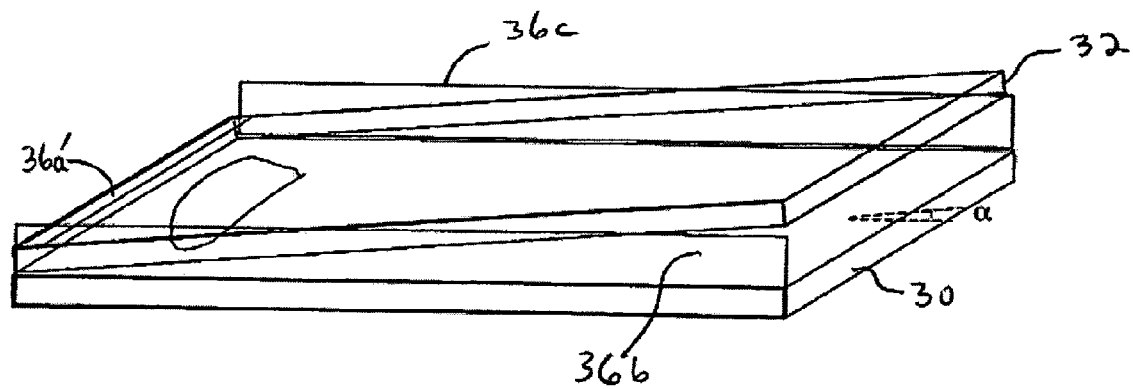
FIG. 3B shows a second general step for manufacturing a liquid crystal cell assembly according to a second embodiment of the assembly method herein.

Referring now to FIG. 3B, the second (top) substrate 32 is shown. The front edge of substrate 32 is aligned with the front edge of substrate 30.

Note that the ITO (or TFT layer) faces the bottom substrate 30. The top substrate 32 is in contact with the bottom substrate 30 only at the front edge of the substrates. The top substrate 32 is at a slant angle alpha with respect to the bottom substrate 30. The substrates are temporarily adhered to tape section 36*a*, in this embodiment by folding the tape 36*a*'. Note that although tape is shown in this example, it should be appreciated that other suitable temporary adhesion methods or materials may be employed. The steps of FIGS. 2B and 3B provide a liquid crystal cell sub-assembly 38 (FIG. 4).

Referring now to FIG. 4, while maintaining the same slant angle alpha, the entire sub-assembly 38 (comprising the bottom substrate 30 and the top substrate 32) is tilted. Note that the steps of FIG. 4-9 are generally the same regardless of whether the preliminary steps of FIGS. 2A, 3A, or 2B, 3B are selected. Preferably, the sub-assembly 38 is gently tilted. The LC material is allowed to flow to the front edge, preferably as a single point, as indicated by reference numeral 40. Vibration may be utilized in order to avoid bubble entrapment attributed to uneven characteristics in the flow of LC material.

Figure 5:
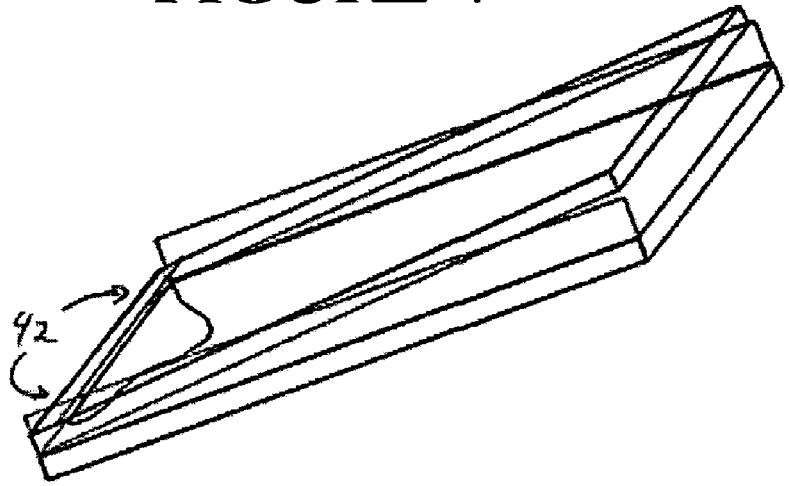
FIG. 5 shows a fourth general step for manufacturing a liquid crystal cell assembly, showing side spreading of liquid crystal material along the temporarily adhered edge.

Referring now to FIG. 5, the flow of the LC material mixture reaches the front end. When proper conditions are met (e.g., tilt angle, material viscosity, placement of mass 34, and other factors), LC material should expand toward the side edges, represented by reference numeral 42. In certain embodiments, the flow is allowed to reach about 3 to about 4 inches from the edges. The sub-assembly 38 is brought back to a flat position.

Figure 10A:
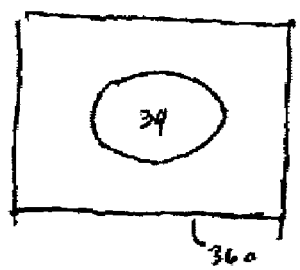
FIGS. 10A-10E detail the liquid crystal material flow pattern.
Figure 10B:
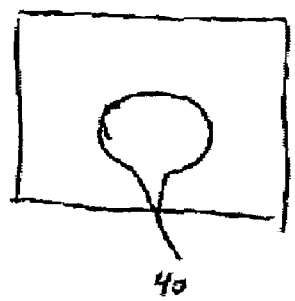
Figure 10C:
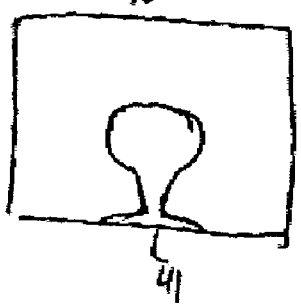
Figure 10D:
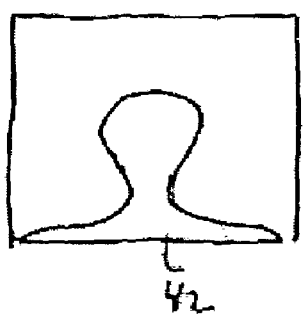
Figure 10E:
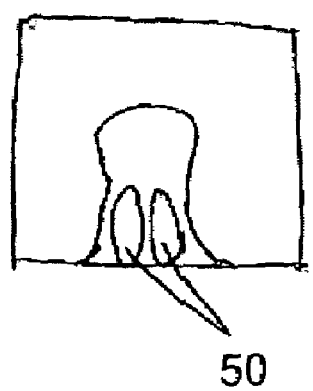
Figure 11:
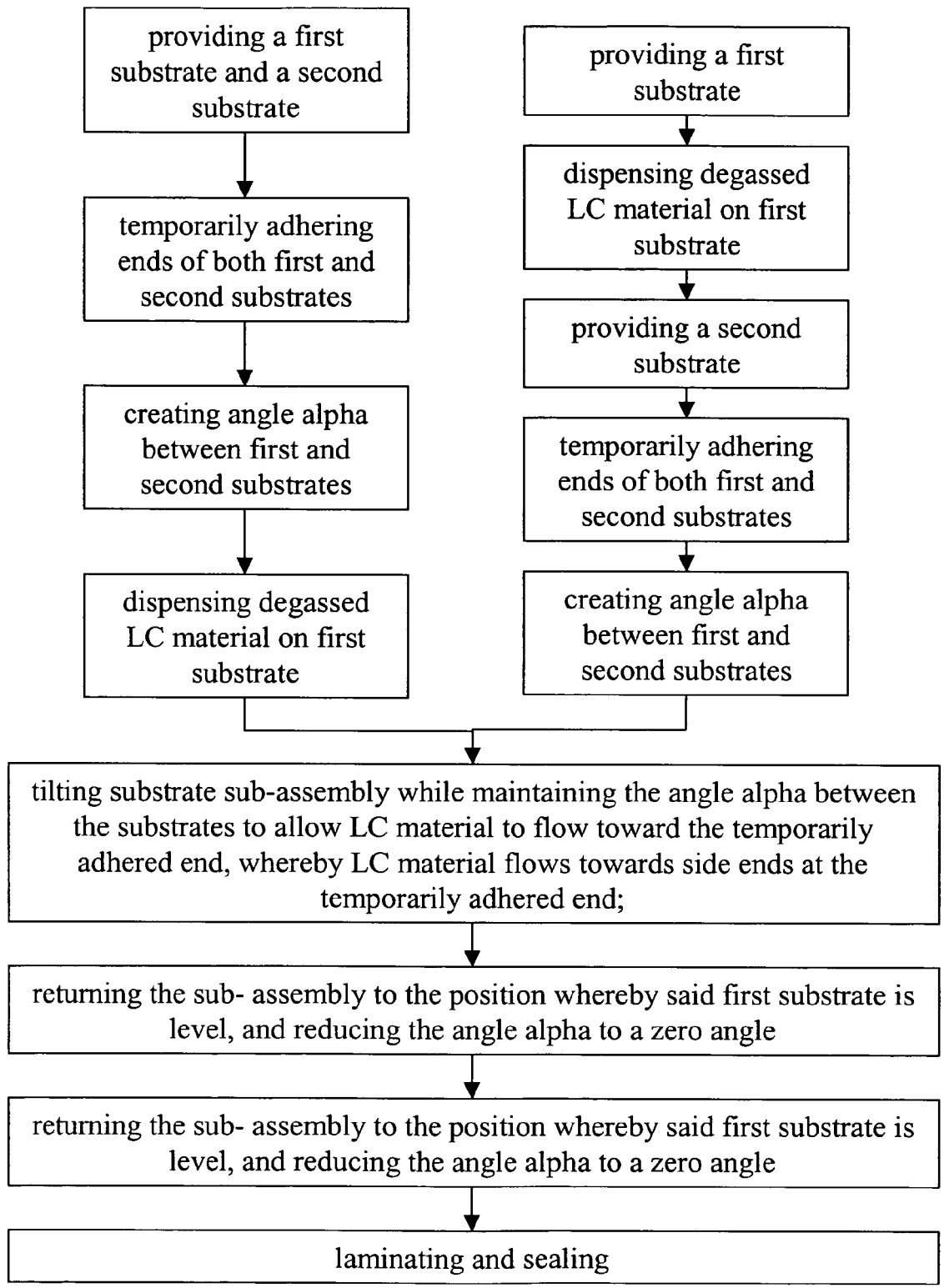
FIG. 11 provides a flow chart of the assembly steps of the liquid crystal cell assembly methods herein.

The dispensing of LC material and flow during tilt is described in further detail with respect to FIGS. 10A-10D. Referring to FIG. 10A, mass 34 of LC material is dispensed. When the assembly is tilted at an optimum range of tilt angles and rate of tilt (also accounting for other factors including but not limited to material viscosity, surface friction, etc.) and referring to FIG. 10B, point contact 40 is established. This point contact is important, as evidenced by FIG. 10E, showing a situation wherein no point contact is established. The open areas 50 between LC material allow entrapment of air pockets within the fluid, with no route for escape, making bubble free cells virtually impossible without substantial pressure differential (e.g., by conventional vacuum techniques). Referring to FIGS. 10C and 10D, the flow of the LC material remains at the front edge, traversing 41, 42 across the edge having tape 36*a*, ultimately close to the side edges of the cell prior to closing the cell.

Figure 6:
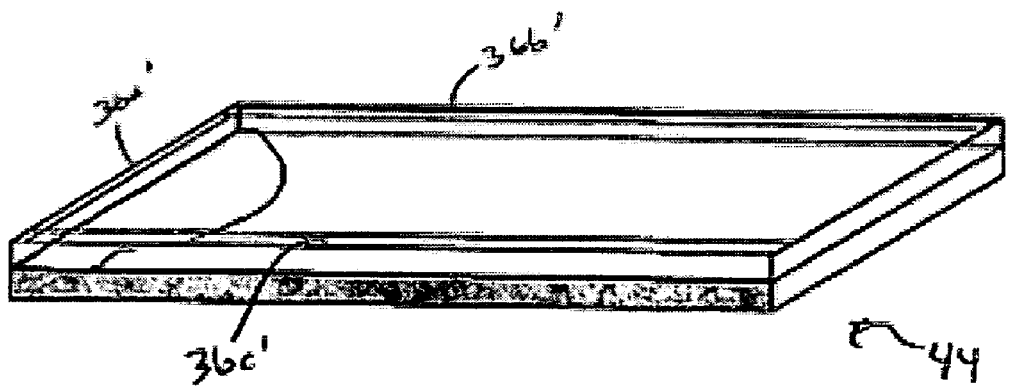
FIG. 6 shows closing and leveling of the liquid crystal cell sub-assembly.

Referring now to FIG. 6, the slant angle alpha is gently reduced to zero, whereby the glass is closed to form an assembly 44.

Figure 7:
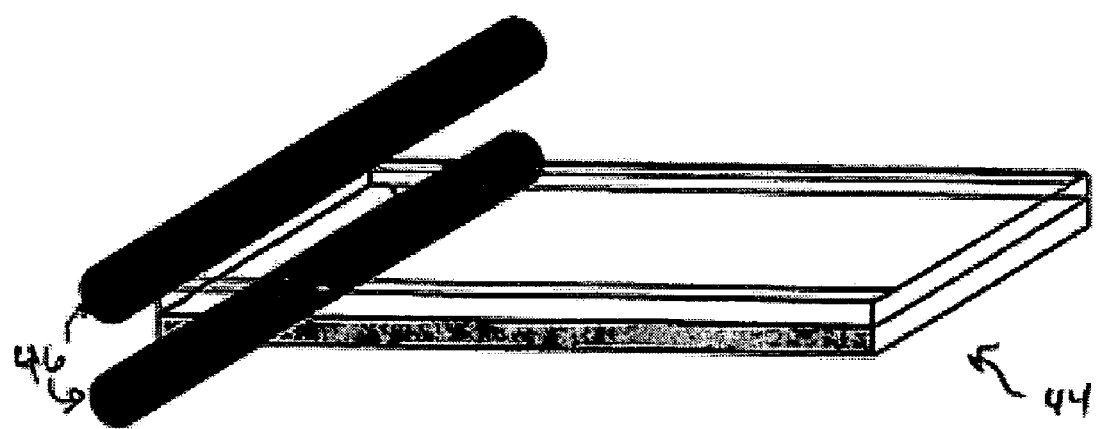
FIGS. 7 and 8 show laminating of the liquid crystal cell assembly.

Referring now to FIGS. 6 and 7, the assembly 44 is laid on flat surface (not shown). Tape around the side edges is incorporated (as in the case of the preliminary steps described with respect to FIGS. 2A and 3A) or folded (as in the case of the preliminary steps described with respect to FIGS. 2B and 3B) as indicated by reference numerals 36*b*' and 36*c*'.

Figure 8:
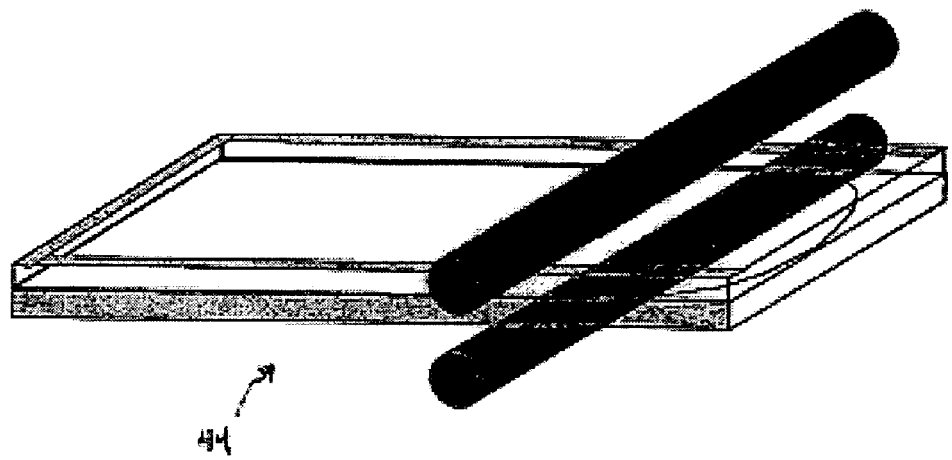

The assembly 44 is then subject to lamination, e.g., through laminating rollers 46. The speed of rollers 46 should be optimized such that LC flow is at a suitable speed to be dispersed throughout the entire panel. FIG. 8 shows assembly 44 after lamination, whereby LC material is dispersed throughout the cell.

In certain embodiments, it may be necessary to further process the assembly to eliminate streaks that may have occurred during lamination. While preferably placing the assembly onto a flat surface, the tape 36*a*-36*c* is removed. The liquid crystal material is sheared by shifting the top plate relative to the bottom plate (or vice-versa) in a manner to smear away any streaks that may have occurred during lamination.

In certain embodiments, prior to final sealing of the assembly to form the desired liquid crystal cell, alignment or registration may be required. For example, it is known in the art of liquid crystal cells to align the substrates at some juncture in the processing. In one example, the top and bottom plates may be slightly displaced (e.g., about 2 mm in both x and y directions). The top and bottom substrates then may be registered by aligning the registration marks of the top and bottom substrates (as is known to one skilled in the LC cell arts). The aligned assembly may then be fixed by adhering the corners, e.g., with a hot-melt glue gun or a suitable equivalent.

In certain embodiments, it may be necessary to control the cell gap. For example, the laminated LC assembly may be laid on a flat surface. The assembly may be compressed, e.g., with an air bag by applying pressure to the air bag. In certain preferred embodiments, the air bag is inflated to about 7 psi.

Figure 9:
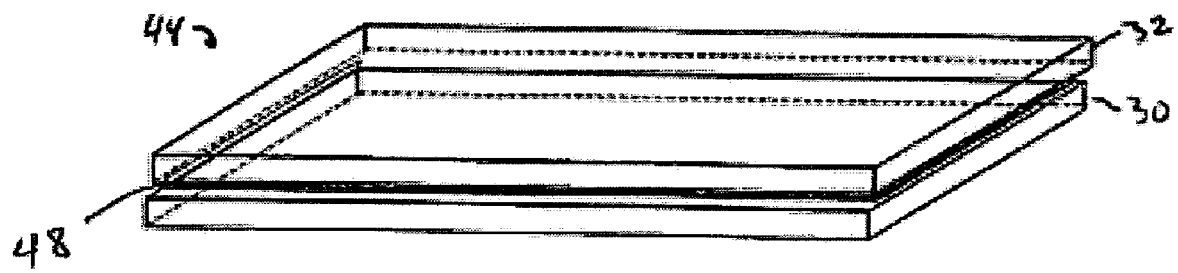
FIG. 9 shows edge sealing of the liquid crystal cell assembly.

To finalize the cell manufacturing process, the assembly 44 must be sealed, generally by adhering the substrates 30, 32. This may be accomplished by any known method. In one embodiment, for example, the assembly is maintained under about 7 psi pressure of an air bag, e.g., as described above related to cell gap control. Excess LC material may be cleaned along edges of the LC cell assembly 44. The pressure of the air bag may be reduced slightly to allow LC material to flow back to inside of the cell (for example, to about 6 Psi). Referring to FIG. 9, light curable adhesive 48 is applied to the cell edges. Any suitable adhesive may be used that is non-reactive with the selected LC materials. The pressure then may further be reduced to about 4 psi, thereby allowing adhesive enter between substrates 30, 32 along the edges. Finally, the edges are cured with a suitable light source as indicated by the type of adhesive selected. The cell may be cleaned as is known in the art.

The LC cell is thus produced according to the invention with the requirement of vacuum only to degas the LC material prior to dispensing on the substrate. Dispensing, lamination, alignment, and all other steps need not be in a vacuum environment as is required by conventional processes.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of manufacturing liquid crystal cells, comprising:
    performing substantially all mechanical steps under substantially atmospheric conditions thereby facilitating liquid crystal cell assembly,
    providing an assembly including a first substrate and second substrate with an angle alpha between the first and second substrates;
    providing a liquid crystal material between the first and second substrates;
    tilting both the first and second substrates, while substantially maintaining the angle alpha therebetween,
    wherein the liquid crystal material flows towards a low end of the assembly and toward sides of the low end; and
    laminating the assembly to allow the liquid crystal material to cover inner surfaces of the substrates.

2. A method of manufacturing liquid crystal cells as in claim 1, wherein bubble-free liquid crystal cells are formed.

3. A method of manufacturing liquid crystal cells as in claim 1, wherein cells having dimensions of at least greater than or equal to about 0.5 meters and bubble-free liquid crystal material are formed.

4. A method of manufacturing LC cells comprising:
    providing a first substantially planar substrate in a first position having a first substrate inner surface and a first substrate outer surface in an atmospheric environment;
    providing a second substantially planar substrate having a second substrate inner surface and a second substrate outer surface in an atmospheric environment, wherein the first substrate inner surface and the second substrate inner surface face each other;
    temporarily adhering a first distal end of both the first substrate and the second substrate;
    displacing opposite second distal ends of the first substrate and the second substrate such that said second substrate is at an angle alpha relative to said first substrate in said first position, thereby forming a substrate sub-assembly in an atmospheric environment;
    dispensing degassed liquid crystal material on said first substrate inner surface in an atmospheric environment;
    tilting said substrate sub-assembly while maintaining the angle alpha between the first substrate and the second substrate to allow said liquid crystal material to flow toward said first distal end in an atmospheric environment, whereby said liquid crystal material flows in a direction towards side ends at said first distal end;
    returning said substrate sub-assembly to the position whereby said first substrate is in said first position, and reducing the angle alpha to a zero angle so that the first substrate and the second substrate are adjacent;
    temporarily adhering the second distal end and the sides of both the first substrate and the second substrate in an atmospheric environment;
    laminating the temporarily adhered substrate sub-assembly to allow the liquid crystal material to cover the substrate inner surfaces; and
    sealing the substrate assembly.

5. A method of manufacturing LC cells comprising:
    providing a first substantially planar substrate in a first position having a first substrate inner surface and a first substrate outer surface in an atmospheric environment;
    dispensing degassed liquid crystal material on said first substrate inner surface in an atmospheric environment;
    providing a second substantially planar substrate having a second substrate inner surface and a second substrate outer surface in an atmospheric environment, wherein the first substrate inner surface and the second substrate inner surface face each other, and further wherein the second substrate is in a second position;
    temporarily adhering a first distal end of both the first substrate and the second substrate, while maintaining opposite second distal ends of the first substrate and the second substrate such that said second substrate is at an angle alpha relative to said first substrate in said first position, thereby forming a substrate sub-assembly in an atmospheric environment;
    tilting said substrate sub-assembly while maintaining the angle alpha between the first substrate and the second substrate to allow said liquid crystal material to flow toward said first distal end in an atmospheric environment, whereby said liquid crystal material flows in a direction towards side ends at said first distal end;
    returning said substrate sub-assembly to the position whereby said first substrate is in said first position, and reducing the angle alpha to a zero angle so that the first substrate and the second substrate are adjacent;
    temporarily adhering the second distal end and the sides of both the first substrate and the second substrate in an atmospheric enviromnent;
    laminating the temporarily adhered substrate sub-assembly to allow the liquid crystal material to cover the substrate inner surfaces; and
    sealing the substrate assembly.

* * * * *